United States Patent
Enomoto et al.

(10) Patent No.: US 6,415,547 B1
(45) Date of Patent: Jul. 9, 2002

(54) SPROUTED VEGETABLE SEEDS STERILIZING METHOD

(75) Inventors: Katsuyoshi Enomoto, Kanagawa-ken; Takayuki Kemuriyama, Kawagoe; German Regli, Tsurugashima, all of (JP)

(73) Assignee: Daisey Machinery Co., Ltd., Tsurugashima (JP)

( * ) Notice: Subject to any disclaimer, the term of this patent is extended or adjusted under 35 U.S.C. 154(b) by 0 days.

(21) Appl. No.: 09/492,271

(22) Filed: Jan. 27, 2000

(30) Foreign Application Priority Data

Mar. 30, 2001 (JP) ............................................. 11-017160

(51) Int. Cl.$^7$ .................................................. A01C 1/00
(52) U.S. Cl. ..................................................... 47/58.1
(58) Field of Search .............................. 47/58.1, 57.6; 71/64.07; 564/100; 427/213.36

(56) References Cited

U.S. PATENT DOCUMENTS 5,615,518 A * 4/1997 Suzuki et al. .................. 47/58
6,112,457 A * 9/2000 Kohno et al. ................ 47/57.6

* cited by examiner

Primary Examiner—Peter M. Poon
Assistant Examiner—Floris Copier
(74) Attorney, Agent, or Firm—Oblon, Spivak, McClelland, Maier & Neustadt, P.C.

(57) ABSTRACT

Sprouted vegetable seeds before rearing are sterilized so as to grow without being putrefied and to be harvested without sticking of food poisoning germs. Sprouted vegetable seeds are first pre-soaked in water of 5 to 25° C. for 30 to 60 minutes, then pre-heated at 40 to 80° C. for 10 to 30 seconds, exposed to 70 to 90° C for 10 to 120 seconds for sterilization and cooled at 15 to 25° C.

13 Claims, 1 Drawing Sheet

SPROUTED VEGETABLE SEEDS STERILIZING METHOD

BACKGROUND OF THE INVENTION

1. Field of the Invention

The present invention relates generally to a sprouted vegetable seeds sterilizing method and more particularly to a sterilizing method for destroying bacteria existing on raw material seeds in the process of cultivating sprouted vegetables, for example various kinds of sprouts such as black mung bean sprouts, mung bean sprouts, soybean sprouts or alfalfa sprouts, and KAIWARE radish or the like, said bacteria including not only microorganisms breeding during the cultivation of the sprouted vegetables to damage their growth or to putrefy them but also germs, such as food poisoning germs to cause food poisoning when the sprouted vegetables after harvested are eaten, or the like.

2. Description of the Prior Art

In cultivating the sprouted vegetables wherein seeds of various kinds of sprouts are sprouted to grow slightly to be good for eating, it is important to promote their rearing while restraining breeding of harmful bacteria. Also, as these sprouted vegetables are often eaten fresh or half-cooked, it is needed to make lessened various kinds of microorganisms or germs, such as food poisoning germs, sticking to the sprouted vegetables as harvested.

Especially, while the sprouted vegetables are cultivated at a temperature and humidity suitable for their sprouting and growth, such rearing environment is also an environment suitable for breeding of various kinds of microorganisms or germs. Hence, in rearing the sprouted vegetables, it is important to ensure such condition that the microorganisms, even in a small quantity, sticking to the seeds of the sprouted vegetables are removed sufficiently.

In terms of poisoning from eating of alfalfa sprouts or the like, it is known that microorganisms or germs coming from their raw material seeds relate thereto. These microorganisms or germs are considered to come from contamination by excrement of wild animals at farms where the seeds are harvested or by small animals, such as rats, while the seeds are stored.

There are often seen accidents of poisoning from eating of alfalfa sprouts in countries of America and Europe and countermeasures therefor are being seeked variously. As seeds of the alfalfa sprouts are harvested by machinery and their shells are weak comparatively to be broken easily, even in a case of contamination by disease germs from outside, it is considered that interiors of the seeds are contaminated and in this case, there is a possibility that the contamination has come up to inside of the shells or embryos of the seeds.

Conventionally, sterilization of the seeds has been done in such way that chemicals of hypochloric acid or the like are used or the seeds are dipped in a hot water of about 60 to 70° C. for a few minutes. However, there have been some cases where the effect of the sterilization is not obtained sufficiently even by use of a high concentration hypochloric acid and this is considered because the contamination has spread to the interiors of the seeds, as mentioned above.

It is difficult to destroy microorganisms or germs without damaging life activities of the seeds to sprout and grow as a living thing and in addition, it is not permitted to use strong chemicals because sprouted vegetables are foods which are often eaten fresh or half-cooked.

Under the mentioned circumstances, the present applicant has heretofore disclosed a new method in the Japanese laid-open patent application No. Hei 6-261634 to perform a sterilization effectively of microorganisms or germs existing on outer surfaces or inner surfaces of outer shells of the sprouted vegetable seeds by bringing all the seeds into contact uniformly for a controlled time with a high temperature adjusted to such a temperature condition as not to damage living powers of the seeds. However, in the case of the seeds having damages on their shells (damaged seeds) as mentioned above, there is found a problem that a sterilization cannot be done sufficiently even if they are treated by a sufficient thermal treatment condition.

SUMMARY OF THE INVENTION

In view of the problem in the prior art, it is an object of the present invention to provide a sprouted vegetable seeds sterilizing method by which the above-mentioned sprouted vegetable seeds sterilization disclosed by the present applicant can be done effectively and also especially food poisoning germs can be destroyed.

Based on the fact that even if an accurate thermal sterilization has been done for the sprouted vegetable seeds, food poisoning germs have not been destroyed completely, the inventors here have pursued the cause therefor and found that according to a lot of raw material seeds, the shells are largely damaged so that the food poisoning germs encroach up to interiors of the seeds and this is the reason why the thermal sterilization has been insufficient.

Thus, in order to destroy the food poisoning germs which have encroached up to insides of the shells, the present invention provides a sprouted vegetable seeds sterilizing method comprising steps of; pre-soaking the sprouted vegetable seeds in water; then pre-heating them; then exposing them to a high temperature for a short time for sterilization; and a cooling them.

In the sprouted vegetable seeds sterilizing method of the present invention, the pre-soaking which is to be done before the thermal sterilizing treatment is needed to be carried out at a temperature which is as low as possible in order not to damage embryos in the subsequent thermal sterilizing treatment and also to be carried out in an accurate and suitable temperature and time in order to make the sterilization in the high temperature sterilizing treatment effective. In terms of the temperature and time of the pre-soaking, there are optimum values thereof according to the kinds of the sprouted vegetable seeds and the place and year of harvest thereof and while being needed to be selected suitable, the pre-soaking is generally in the range of 30 to 60 minutes at a temperature of 5 to 25° C. The accurate pre-soaking can be judged by measuring a water absorption of the seeds after soaking them in water.

Also, in the sprouted vegetable seeds sterilizing method of the present invention, while the temperature and time of the pre-heating are needed to be selected according to the sprouted vegetable seeds, the pre-heating is generally in the range of 10 to 30 seconds at a temperature of 40 to 80° C.

The temperature and time of the high temperature sterilizing treatment are also needed to be selected suitably according to the sprouted vegetable seeds but the high temperature sterilizing treatment is generally in the range of 10 to 120 seconds at a temperature of 70 to 90° C. Also, as to the temperature and time of the cooling, they are needed to be selected according to the sprouted vegetable seeds and it is effective to do the cooling immediately after the high temperature sterilizing treatment at temperature of 15 to 25° C. generally.

In the pre-soaking of the present invention, it is possible to add a low concentration sterilizing agent of hypochloric acid, chlorine, ethanol or the like or to use an ozone water. Also, in the cooling treatment after the high temperature sterilization, it is effective to enhance the sterilizing effect further by using a hypochloric acid water solution or ozone water.

In the thermal sterilizing treatment method according to the present invention, as mentioned above, the sprouted vegetable seeds are pre-soaked in water so that the shells are swollen to improve the heat transfer to the shell interiors and also to remove bubbles existing between the shells and the embryos, thereby the heat of the subsequent high temperature treatment encroaches from damaged portions of the shells and the food poisoning germs existing inside of the shells can be destroyed efficiently by the heat.

Also, the low temperature water is used in the pre-soaking, thereby a damage which the embryos may receive in the subsequent high temperature treatment can be mitigated and lowering of a sprouting rate due to the high temperature treatment can be suppressed.

In the thermal sterilizing treatment method according to the present invention as mentioned above, as the sprouted vegetable seeds are treated by the pre-soaking and then by the thermal sterilization, the sprouted vegetable seeds which have been swollen by the pre-soaking become in the state where the outside heat is easy to transfer therein and the thermal sterilizing treatment to be then carried out can be perfected uniformly to the entire interiors of the sprouted vegetable seeds as well as the damage which the embryos may receive in the subsequent high temperature treatment can be mitigated.

Thus, according to the sterilizing method of the present invention, the thermal sterilizing treatment before rearing the seeds is perfected so that the seeds are reared in an almost completely sterilized state, hence there occurs no case of the microorganisms breeding to obstruct a normal rearing of the sprouted vegetables or to putrefy them and also there is no case of the food poisoning germs sticking to the sprouted vegetables as harvested, thereby the sprouted vegetables can be served safely for eating.

DESCRIPTION OF THE PREFERRED EMBODIMENT

Figure 1:
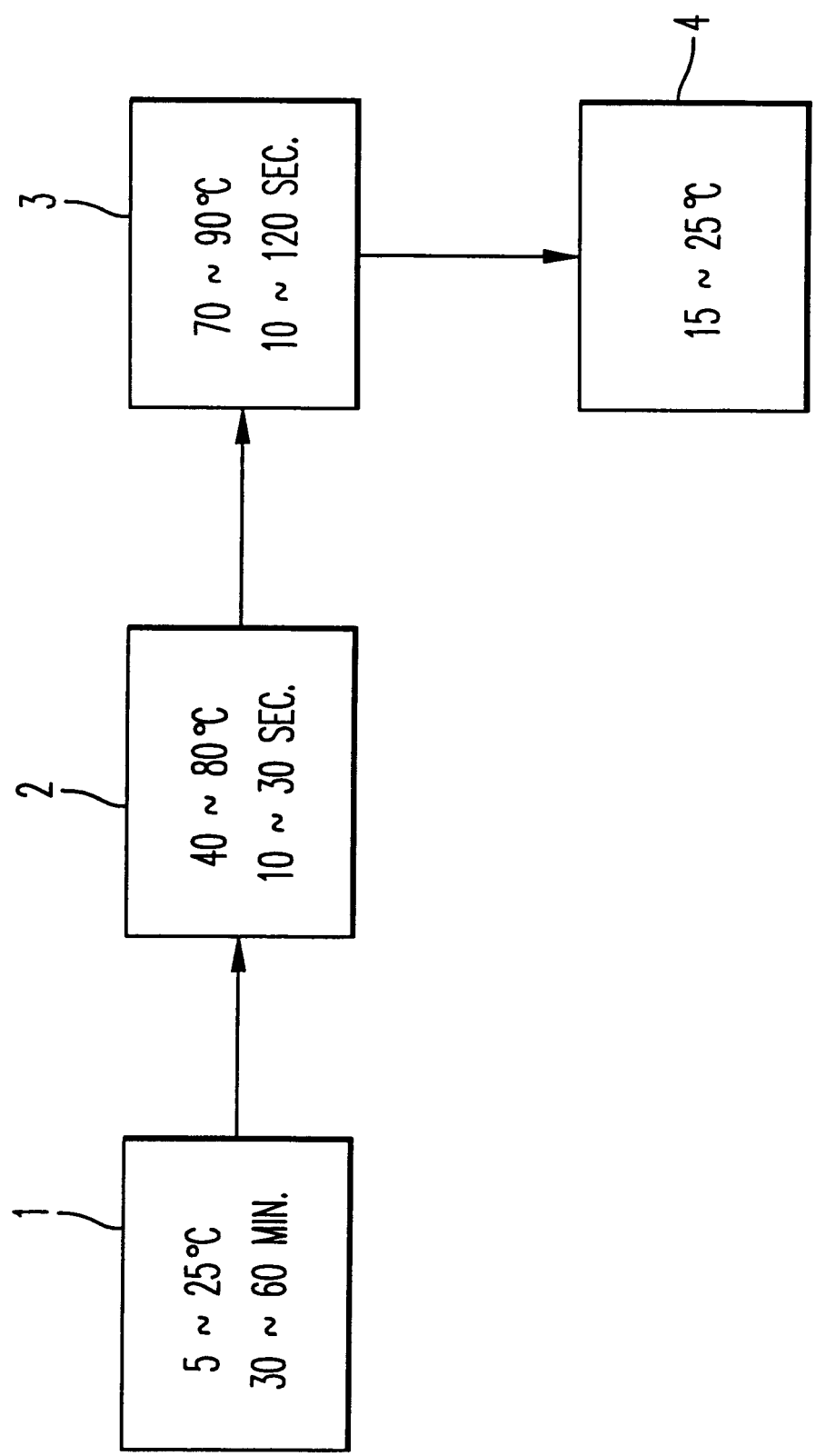
FIG. 1 is a block diagram showing an embodiment of a sprouted vegetable seeds sterilizing method according to the present invention.

Herebelow, an embodiment of a sprouted vegetable seeds sterilizing method according to the present invention will be described concretely with reference to FIG. 1.

In FIG. 1, numeral 1 designates a pre-soaking step, in which sprouted vegetable seeds, for example alfalfa seeds, are soaked in water of a temperature of 5 to 25° C. for 30 to 60 minutes. Numeral 2 designates a pre-heating step, in which the sprouted vegetable seeds after the pre-soaking step 1 are dipped in a warm water, which is kept in a temperature of 40 to 80° C. for example, for about 10 to 30 seconds.

Numeral 3 designates a high temperature sterilizing step, in which the sprouted vegetable seeds after the pre-heating step 2 are brought into contact with a high temperature water, which is kept in a temperature of 70 to 90° C. for example, for 10 to 120 seconds. Numeral 4 designates a cooling step, in which the sprouted vegetable seeds after the high temperature sterilizing step 3 are dipped in water which is kept in a temperature of 15° C. for example.

Functions of the mentioned steps of the sterilizing method will be described. The seeds to be treated, which are dry, are first soaked in water to be swollen at the pre-soaking step 1. By the seeds to be treated being so swollen, the seeds become in the state where heat from outside is easy to transfer into interiors of the seeds uniformly as well as a thermal damage given on embryos in the next high temperature sterilizing treatment step is mitigated.

The seeds to be treated after swollen at the pre-soaking step 1 are sent to the pre-heating step 2, in which the seeds are moved in the warm water or 40° C., for example, so that every piece of particles of the seeds is pre-heated uniformly. By being so pre-heated, the seeds are kept in a predetermined temperature without being influenced by the surrounding temperature, which results in enhancing an accuracy in which the seeds are kept in a predetermined temperature needed at the next high temperature sterilizing step 3.

The seeds to be treated are then sent to the high temperature sterilizing step 3, where the seeds are moved in the high temperature water of a predetermined accurate temperature, which is limited narrowly, 80° C. for example, so that all the particles of the seeds are kept uniformly in the predetermined accurate sterilizing temperature for a predetermined time, thereby microorganisms existing inside or outside of shells of the seeds are destroyed while the seeds remain with their living power being not damaged.

Upon completion of the sterilization, the seeds to be treated are sent to the cooling step 4 to be brought into contact-with a low temperature cooling water. In the cooling step 4, the seeds after sterilized by contact with the high temperature water are moved in the cooling water so that all the particles of the seeds are quenched uniformly to a temperature of 25° C. or lower. The seeds so quenched are collected as sterilized seeds.

It is to be noted that while in the present embodiment as illustrated, the sterilizing treatment in the high temperature sterilizing step 3 is done by use of the high temperature water, this high temperature sterilizing treatment may be done by a thermal sterilizing treatment using wet heat, other than the high temperature water, of a high temperature steam or the like or dry heat of a high temperature gas, a high temperature air or the like, as shown in the Japanese laid-open patent application No. Hei 6-261634.

Also, the mentioned values of the temperature are only for examples and needless to mention, the exact temperature may be selected suitably within the scope of the present invention according to the kinds of the sprouted vegetable seeds to be treated.

Actual examples of sterilization according to the present invention will be described below.

EXAMPLE 1

Alfalfa seeds inoculated with food poisoning germs are heat-treated as follows. The seeds are treated in advance to be inoculated with colitis germs and are sterilized by the following hot water treatment and number of the colitis germs alive in the seeds immediately after sterilized and existence of the colitis germs in the seeds left in a peptone water for one night after sterilized are inspected.

Pre-soaking: 30 minutes at 15° C., Pre-heating: 9 seconds at 70° C., High temperature treatment: 9 seconds at 85° C. and Cooling: 9 seconds at 15° C.

The results are shown in Table 1. While a considerable sterilizing effect is seen even only by the high temperature treatment, the colitis germs inoculated can be destroyed completely by applying the pre-soaking.

TABLE 1

| Seeds treatment | Number of colitis germs alive * | Sterilizing effect (%) | Colitis germs inspection of next day |
|---|---|---|---|
| Non-treatment | 7800000 | | ... |
| Hot Water treatment | 270 | 99.997 | ... |
| Hot water treatment with pre-soaking | 0 | 100 | Negative |

* pieces/g

EXAMPLE 2

Lowering of sprouting rate of alfalfa seeds due to the thermal treatment is inspected. The same thermal treatment as in the Example 1 is applied to the seeds which are not inoculated with germs and the sprouting rate is as per shown in Table 2.

It is observed that while both of the sprouting rate and the normal rearing rate are lowered by the thermal treatment as compared with the non-treatment case, such lowering can be mitigated by applying the pre-soaking treatment.

TABLE 2

| Seeds treatment | Sprouting rate (%)* | Normal rearing rate (%)* |
|---|---|---|
| Non-treatment | 97.2 ± 1.4 | 91.3 ± 1.4 |
| Hot water treatment | 86.3 ± 7.4 | 70.7 ± 3.4 |
| Hot water treatment with pre-soaking | 89.7 ± 2.6 | 83.3 ± 1.7 |

*Value four days after start of rearing (average value ± standard deviation)

EXAMPLE 3

Change in the sterilizing effect due to difference in the pre-soaking time is inspected. The same thermal treatment as in the Example 1 is applied, except changing the pre-soaking time, and degree of the sterilization by the high temperature treatment using the hot water is inspected and the results are shown in Table 3. As shown there, there is seen no complete effect of the soaking in the pre-soaking of 10 minutes but in the case of the pre-soaking of 30 minutes or more, a complete sterilization is realized.

TABLE 3

| Pre-soaking time | Number of colitis germs alive * | Sterilizing effect (%) | Colitis germs inspection of next day |
|---|---|---|---|
| 10 minutes | 180 | 99.998 | ... |
| 30 minutes | 0 | 100 | Negative |
| 60 minutes | 0 | 100 | Negative |

* pieces/g

EXAMPLE 4

Change in the sprouting rate according to the pre-soaking time and temperature is inspected. The same thermal treatment as in the Example 1 is applied and the sprouting rate and the normal rearing rate according to the pre-soaking time and temperature are inspected. The results are shown in Table 4. It is observed that as the pre-soaking temperature is higher and the time is more, the sprouting rate and the normal rearing rate are lower but in the pre-soaking up to 15° C. and 30° C., favorable sprouting rate and normal rearing rate are realized.

TABLE 4

| Pre-soaking treatment | Sprouting rate (%)* | Normal rearing rate (%)* |
|---|---|---|
| 10 minutes at 15° C. | 90.7 ± 3.4 | 83.7 ± 3.7 |
| 30 minutes at 15° C. | 89.7 ± 2.6 | 83.3 ± 1.7 |
| 30 minutes at 25° C. | 80.7 ± 3.9 | 58.7 ± 1.4 |
| 60 minutes at 5° C. | 77.3 ± 8.7 | 68.3 ± 9.2 |
| 60 minutes at 15° C. | 73.3 ± 6.1 | 65 ± 8.6 |
| 60 minutes at 25° C. | 15.3 ± 3.4 | 7.7 ± 2.4 |

*Value four days after start of rearing (average value ± standard deviation)

EXAMPLE 5

Alfalfa seeds are applied by the pre-soaking in various water temperature and time and water content of the seeds after the pre-soaking and sprouting rate after the subsequent thermal treatment are inspected, wherein the thermal treatment is done as follows; pre-heating: 9 seconds at 50° C., thermal treatment: 9 seconds at 85° C. and cooling: 9 seconds at 15° C. The results are shown in Table 5. By the pre-soaking of 60 minutes at water temperature of 15° C. and that of 30 minutes at 25° C., the water contents of the seeds after the pre-soaking are 122% and 117%, respectively, and the sprouting rates according to them are 75.7% and 73%, respectively. This means that even at the temperature of 25° C., a satisfactory sprouting rate in the same level as in the lower temperature of 15° C. can be obtained with a shorter time.

TABLE 5

| Pre-soaking treatment | | Seeds (%) | |
|---|---|---|---|
| Water temperature (° C.) | Time (minutes) | Water content (%) | Sprouting rate (%)* |
| 15 | 30 | 111 | 83.3 |
|  | 60 | 122 | 75.7 |
|  | 70 | 126 | 47.5 |
|  | 80 | 132 | 34 |
| 25 | 30 | 117 | 73 |
|  | 40 | 125 | 64.5 |
|  | 50 | 135 | 28.5 |

*Pre-heating: 9 seconds at 50° C., thermal treatment: 9 seconds at 85° C. and cooling: 9 seconds at 15° C.

What is claimed is:

1. A sprouted vegetable seed sterilizing method, comprising first pre-soaking said seed in water followed by;

pre-heating said seeds followed by;

exposing said seeds to a high temperature for a short time for sterilization wherein said seeds are sterilized at a temperature of from 70 to 90° C. for 10 to 120 seconds; and followed by cooling said seeds.

2. Sprouted vegetable seeds sterilizing method as claimed in claim 1, effecting said pre-soaking in the water of 5 to 25° C. for 30 to 60 minutes.

3. The sprouted vegetable seed sterilizing method of claim 1, wherein said seeds are cooled at a temperature of from 15 to 25° C.

4. The sprouted vegetable seeds sterilizing method according to claim 1, wherein a sterilizing agent is added to said pre-soak water.

5. The sprouted vegetable seeds sterilizing method according to claim 4, wherein said sterilizing agent is chosen from the group consisting of hypochloric acid, chlorine, ethanol and ozone water.

6. The sprouted vegetable seeds sterilizing method according to claim 1, wherein said seeds are cooled in hypochloric acid or ozone water.

7. The sprouted vegetable seed sterilizing method of claim 1, wherein said preheating is effected at a temperature of from 40 to 80° C.

8. The sprouted vegetable seed sterilizing method of claim 1, wherein said seeds are preheated for 10 to 30 seconds.

9. A sprouted vegetable seeds sterilizing method comprising the steps of:

first pre-soaking said seeds in water at a temperature of 5 to 25° C. for 30 to 60 minutes followed by;

first pre-heating said seeds followed by;

exposing said seeds to a high temperature for a short time for sterilization followed by; and cooling said seeds.

10. The sprouted vegetable seed sterilizing method according to claim 9, wherein said seeds are sterilized for 10 to 120 seconds.

11. The sprouted vegetable seed sterilizing method according to claim 9, wherein said seeds are sterilized at a temperature of from 70 to 90° C.

12. The sprouted vegetable seed sterilizing method according to claim 9, wherein said seeds are pre-heaed for 10 to 30 seconds.

13. The sprouted vegetable seed sterilizing method according to claim 9, wherein said pre-heating is effected at a temperature of from 40 to 80° C.

* * * * *

UNITED STATES PATENT AND TRADEMARK OFFICE
CERTIFICATE OF CORRECTION

PATENT NO. : 6,415,547 B1
DATED : July 9, 2002
INVENTOR(S) : Enomoto et al.

It is certified that error appears in the above-identified patent and that said Letters Patent is hereby corrected as shown below:

<u>Title page,</u>
Item [30], Foreign Application Priority Data, should read:
-- [30]     Foreign Application Priority Data
Jan. 26, 1999    (JP) ................................ 11-017160 --

Signed and Sealed this

Thirty-first Day of December, 2002

JAMES E. ROGAN
*Director of the United States Patent and Trademark Office*